(12) United States Patent
Jarvis (10) Patent No.: US 12,354,042 B2
(45) Date of Patent: Jul. 8, 2025

(54) ASSET RISK PROFILING FOR ENTERPRISE RESOURCES

(71) Applicant: Allstate Insurance Company, Northbrook, IL (US)

(72) Inventor: Daniel Jarvis, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 351 days.

(21) Appl. No.: 17/878,522

(22) Filed: Aug. 1, 2022

(65) Prior Publication Data
US 2023/0031994 A1 Feb. 2, 2023

Related U.S. Application Data

(60) Provisional application No. 63/228,296, filed on Aug. 2, 2021.

(51) Int. Cl.
*G06Q 10/00* (2023.01)
*G06Q 10/0635* (2023.01)
*G06Q 10/0637* (2023.01)

(52) U.S. Cl.
CPC ... *G06Q 10/0635* (2013.01); *G06Q 10/06375* (2013.01)

(58) Field of Classification Search
CPC .................. G06Q 10/00; G06Q 50/00
USPC ........................................ 705/7.28
See application file for complete search history.

(56) References Cited

U.S. PATENT DOCUMENTS

| | | | |
|---|---|---|---|
| 11,757,916 B1 * | 9/2023 | Woolgar-O'Neil | ......................... G06Q 10/0635 |
| 2019/0171985 A1 * | 6/2019 | Ferranti | ................... G06F 16/29 |
| 2021/0334832 A1 * | 10/2021 | Walters | ................... G06N 20/00 |
| 2022/0150275 A1 * | 5/2022 | McNee | ............... H04L 63/1441 |

\* cited by examiner

*Primary Examiner* — Mustafa Iqbal
(74) *Attorney, Agent, or Firm* — DINSMORE & SHOHL LLP (57) ABSTRACT

Aspects of the disclosure relate to using machine learning for asset risk profiling. A computing platform may receive risk information from an enterprise system. The computing platform may determine a ranking criterion for a plurality of risk factors. The computing platform may use a machine learning classifier to determine a weight corresponding to each risk factor and determine an asset risk profile (ARP) score for the enterprise system. Based on the ARP score, the computing platform may determine a risk control scheme and provide the risk control scheme to an enterprise control server.

20 Claims, 5 Drawing Sheets

Business Drivers: Section A

- Business Impacts and value
- Regulatory Implications
- Disaster Recovery Designations

Attack Surface: Section B

- Host Strategies
- Internal Facing
- External Facing
- Threat Actor Exposure

Data Access: Section C

- Types of Users
- Number of Users
- Administrator Characteristics
- Third Party Access

Data Types: Section D

- Data Type
  - Public/Proprietary/Personal Information
  - Structured/Unstructured
- Data Classification
- Data Volume and Pervasiveness

FIG. 4

| ARP Categories | Most Critical Impact Application 510 | | Second Most Critical Impact Application 520 | |
|---|---|---|---|---|
| | Criteria | Score | Criteria | Score |
| Business Impacts and Value | 5 Top Level Categories | A1 | 3 Top Level Categories | B1 |
| Regulatory | SOX<br>PCI | A2 | SOX<br>SEC<br>Third Party Compliance | B2 |
| Disaster Recovery | Availability Rank1 | A3 | Availability Rank1 | B3 |
| Attack Surface<br>-Internet Facing<br>-Hosting (Internet/External) | Internet facing<br>Hosted internally | A4 | Not internet facing<br>Hosted internally | B4 |
| Data Access<br>-Types of Users<br>-No. of Users<br>-Admin IDs<br>-Third Party Access | Consumers, employees, 3rd parties, agencies<br>50,000 – 100,000 users<br>Third Party Access (Yes) | A5 | Employees<br>0-10,000 users<br>Third Party Access (No) | B5 |
| Data Types<br>-Personal/Proprietary Data<br>-Classification<br>-Data Volume | Personal data<br>1 million + records<br>Restricted data | A6 | Personal and proprietary data<br>10,000-100,000 records | B6 |
| Total Score | | T1 | | T2 |

FIG. 5

ASSET RISK PROFILING FOR ENTERPRISE RESOURCES

CROSS-REFERENCE TO RELATED APPLICATION

This application claims priority to U.S. Provisional Application No. 63/228,296 filed on Aug. 2, 2021, which is incorporated herein by reference in its entirety.

BACKGROUND

Aspects of the disclosure relate generally to the processing of big data and managing enterprise resources. In particular, aspects of the disclosure relate to using asset risk profiling for managing enterprise systems.

An enterprise may host numerous systems and resources within the organization. Conventional enterprise systems may focus on the protection of resources from the perspective of availability to minimize downtime and may lack insights into a holistic view of enterprise resources. As a result, conventional systems may fail to provide an optimal mechanism to facilitate strategic planning and risk-based decision making.

Aspects described herein may address these and other problems, and generally improve the quality, efficiency, and speed of resource management for monitoring and mitigating potential risks and prioritizing the protection of enterprise resources.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards asset risk profiling for proactively managing enterprise protection efforts and resources. In accordance with one or more embodiments, a computing platform may receive risk information from a plurality of computing devices associated with an enterprise system. The risk information may be associated with a plurality of risk factors associated with the enterprise system. The risk information may indicate a likelihood score associated with an expected impact of loss for each risk factor in an event of a compromise of the enterprise system. The computing platform may determine a ranking criterion for a plurality of risk factors associated with the enterprise system. Using a first machine learning classifier, the computing platform may determine a weight corresponding to each risk factor based on the ranking criterion and the risk information. Based on the risk information and the weights, the computing platform may determine an asset risk profile (ARP) score for the enterprise system. The computing platform may determine, based on the ARP score, an ARP impact rank of a first level or a second level, the first level ranked and comprising corresponding weights higher than the second level. The computing platform may subsequently determine a risk control scheme associated with the enterprise system based on the ARP score. The risk control scheme for the first level may be different from the risk control scheme for the second level. Accordingly, the computing platform may provide the risk control scheme to an enterprise control server to implement the risk control scheme.

In one or more instances, the compromise of the enterprise system may comprise a compromise of confidentiality, integrity, availability, or combinations thereof.

In one or more instances, the first machine learning classifier may receive a collection of risk data and labels associated with a plurality of enterprise systems as training data. The first machine learning classifier may be trained based on the collection of risk data and labels. A first machine learning classifier may determine the weights corresponding to each risk factor based on the trained first machine learning classifier.

In one or more instances, the first machine learning classifier may determine a confidence score indicating whether a predicted label output by the first machine learning classifier matches a pre-defined label of the enterprise system.

In one or more instances, the first machine learning classifier may be tuned until the confidence score exceeds a first predetermined threshold.

In one or more instances, a second machine learning classifier may use the weights generated by the first machine learning classifier as inputs and determine the ARP score for the enterprise system.

In one or more instances, the first machine learning classifier may be an unsupervised machine learning classifier and the second machine learning classifier may a supervised machine learning classifier.

In one or more instances, the computing platform may receive one or more files, and extract the risk information from the one or more files. The one or more files may comprise audio files, internet files, visual files, audiovisual files, text files, image files, multimedia files, or combinations thereof.

In one or more instances, at least one of the risk factors may related to cybersecurity threats or regulator implications.

In one or more instances, the weight corresponding to each risk factor may comprise one or more components including at least a score multiplier assigned to the corresponding risk factor.

In one or more instances, the first level of the ARP impact rank may comprise the ARP score of a first threshold or above and may indicate a critical impact system, and the second level of the ARP impact rank may comprise the ARP score of below the first threshold and may indicate a less critical impact system than the critical impact system of the first level such that the risk control scheme for the first level applies an enhanced critical control scheme compared to the risk control scheme for the second level.

In one or more instances, the computing platform may classify the risk factors into a plurality of data categories based on a pervasiveness and a business value of the enterprise system, and an impact if the enterprise system is compromised.

In one or more instances, the computing platform may classify the risk factors into one of a business drivers category, an attack surface category, a data access category, and a data types category.

In another embodiment, aspects described herein are directed towards an enterprise asset risk profiling platform for proactively managing enterprise protection efforts and resources. In accordance with one or more embodiments, a controller may be configured to receive risk information from a plurality of computing devices associated with an enterprise system. The risk information may be associated with a plurality of risk factors associated with the enterprise system. The risk information may indicate a likelihood score associated with an expected impact of loss for each risk factor in an event of a compromise of confidentiality, integrity, availability, or combinations thereof, prior to an application of enterprise controls. The controller may determine a ranking criterion for a plurality of risk factors associated with the enterprise system. Using a first machine learning classifier, the controller may determine a weight corresponding to each risk factor based on the ranking criterion and the risk information. Based on the risk information and the weights, the controller may determine an asset risk profile (ARP) score for the enterprise system. The controller may determine, based on the ARP score, an ARP impact rank of a first level or a second level, the first level ranked higher than the second level. The controller may subsequently determine a risk control scheme associated with the enterprise system based on the ARP score. The risk control scheme for the first level may be different from the risk control scheme for the second level. Accordingly, the controller may provide the risk control scheme to an enterprise control server to implement the risk control scheme.

In one or more instances, the first machine learning classifier may receive a collection of risk data and labels associated with a plurality of enterprise systems. The first machine learning classifier may be trained based on the collection of risk data and the labels. The trained first machine learning classifier may determine the weights corresponding to each risk factor.

In one or more instances, the first machine learning classifier may determine a confidence score indicating whether a predicted label output by the first machine learning classifier matches a pre-defined label of the enterprise system.

In one or more instances, the controller may tune the first machine learning classifier until the confidence score exceeds a first predetermined threshold.

In one or more instances, the controller may determine the ARP scores by using the weights generated by the first machine learning classifier as inputs for a second machine learning classifier, and using the second machine learning classifier to determine the ARP scores for the enterprise system.

In one or more instances, the first machine learning classifier may be an unsupervised machine learning classifier and the second machine learning classifier may be a supervised machine learning classifier.

In another embodiment, aspects described herein are directed towards an enterprise asset risk profiling platform for proactively managing enterprise protection efforts and resources. The enterprise asset risk profiling platform may include a machine learning classifier, a controller communicatively coupled to the machine learning classifier a non-transitory computer-readable memory communicatively coupled to the controller, and machine-readable instructions stored in the non-transitory memory. When the instructions are executed, the controller may receive risk information from a plurality of computing devices associated with an enterprise system. The risk information may be associated with a plurality of risk factors associated with the enterprise system. The risk information may indicate a likelihood score associated with an expected impact of loss for each risk factor in an event of a compromise of confidentiality, integrity, availability, or combinations thereof, prior to an application of enterprise controls. The controller may determine a ranking criterion for a plurality of risk factors associated with the enterprise system. Using a first machine learning classifier, the controller may determine a weight corresponding to each risk factor based on the ranking criterion and the risk information. Based on the risk information and the weights, the controller may determine an asset risk profile (ARP) score for the enterprise system. The controller may determine, based on the ARP score, an ARP impact rank of a first level or a second level, the first level ranked higher than the second level. The controller may subsequently determine a risk control scheme associated with the enterprise system based on the ARP score. The risk control scheme for the first level may be different from the risk control scheme for the second level. Accordingly, the controller may provide the risk control scheme to an enterprise control server to implement the risk control scheme.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As a general introduction, aspects described herein are directed towards asset risk profiling for managing enterprise resources, which may provide a holistic view of the enterprise systems from the perspectives of security protection, privacy protection, operation risk protection, confidential protection and integrity protection.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like. Computer software, hardware, and networks may be utilized in a variety of different system environments, including stand-alone, networked, remote-access (also known as remote desktop), virtualized, and/or cloud-based environments, among others.

Figure 1:
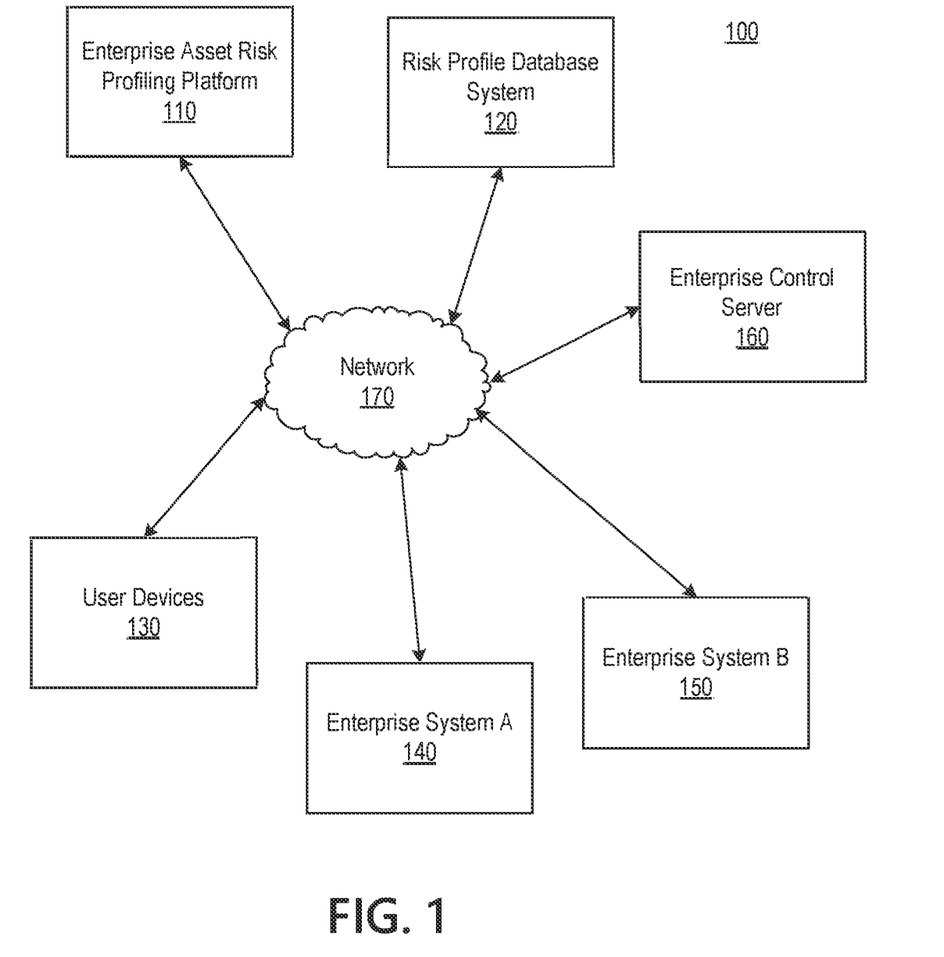
FIG. 1 depicts an illustrative system for asset risk profiling in accordance with one or more example embodiments.

FIG. 1 depicts an illustrative system for asset risk profiling in accordance with one or more example embodiments. Referring to FIG. 1, computing environment 100 may include one or more computer systems. For example, computing environment 100 may include enterprise asset risk profiling platform 110, risk profile database system 120, user devices 130, enterprise system A 140 and enterprise system B 150, and enterprise control server 160 in communication via network 170. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

In embodiments, a computer-implemented method may include receiving risk information from a plurality of computing devices associated with an enterprise system 140-150, the risk information associated with a plurality of risk factors associated with the enterprise system, wherein the risk information is indicative of a likelihood score associated with an expected impact of loss for each risk factor in an event of a compromise of the enterprise system 140-150, prior to an application of enterprise controls.

Enterprise asset risk profiling platform 110 may monitor and receive risk information from enterprise systems 140-150. The risk information may be related to an expected impact of loss in the event of a compromise of confidentiality, integrity, and/or availability on the enterprise systems. For example, the risk information may include one or more aspects of alignment to enterprise strategic initiatives, product security, vulnerability scanning, operational risk, data governance, data loss prevention, privileged account management, privacy, cyber risk assessment, control effectiveness testing, supplier security, cyber security control baselines, and cloud migration, etc.

The computer-implemented model may include receiving one or more files, and extracting the risk information from the one or more files. The one or more files may be audio files, internet files, visual files, audiovisual files, text files, image files, multimedia files, or combinations thereof. Enterprise asset risk profiling platform 110 may extract risk information from any type of files such as files related to a website, a video file, an audio file, a text file, an image file and/or a multimedia file. For example, to facilitate strategic and operational planning, a report, such as a tableau report, may be published periodically (e.g. monthly or quarterly) to track the risk information on the product, project, or service associated with the enterprise systems. Alternatively, a point-in-time snapshot may be taken on the enterprise systems to capture the related risk information. Enterprise asset risk profiling platform 100 may also communicate with the enterprise systems to obtain the risk information.

The computer-implemented method may further include determining a ranking criterion for the plurality of risk factors associated with the enterprise system 140-150. Enterprise asset risk profiling platform 110 may determine a ranking criterion for the risk factors associated with the enterprise systems. The risk factors may be related to business or technological values which determine expected loss for enterprise systems in the event of a compromise in confidentiality, integrity, and/or availability. Forms of loss include but are not limited to reputation, financial, operation, and competitive. For example, a critical system may be identified as a first level (e.g., highest level, or the like) to reflect its criticality in the organization.

The risk factors may be related to regulatory implications, such as requirements of compliance with applicable privacy, cybersecurity, audit and/or financial regulations, etc. Thus, at least one of the risk factors may be related to cybersecurity threats or regulatory implications. By way of example, regulations may include Sarbanes-Oxley (SOX) Act of 2002, which may impose joint responsibility on auditors and management for the detection of fraud and external threats. SOX is designed to help protect investors and bolster trustworthiness of corporate financial statements by requiring stringent record keeping, audits and controls, and outlining requirements for IT regarding electronic records. The regulations may be related to Payment Card Industry (PCI) compliance to protect cardholder data applicable to organizations that accept, transmit, or store that data. The regulations may be related to Health Insurance Portability and Accountability Act (HIPAA) compliance, which the health care organizations may implement into their business to protect the privacy, security, and integrity of protected health information. It should be understood that one or more regulatory risk factors may be industry specific.

The risk factors may be related to cybersecurity threats. For example, the risk factors may be related to disaster recovery designations (e.g. availability ranks), attack surface (e.g. external or internal facing systems, and threat actors exposure), data attributes, such as data types including personal information of the customers or employees of the organization, proprietary information (e.g. pre-release information financial data, business or marketing data); data classifications such as restricted, confidential or public data; data volumes such as the number of unique records of data. The risk factors may be related to how (e.g. internal or external) or who (e.g. agency, consumers, employees, contingent workers or third parties) may have access to the data. The risk factors may be related to the physical or logical locations of the enterprise system. Enterprise asset risk profiling platform 110 may generate a criterion on how to rank the risk factors of the enterprise system.

The computer-implemented may include using a first machine learning classifier to determine a weight corresponding to each risk factor based on the ranking criterion and the risk information. Enterprise asset risk profiling platform 110 may include one or more machine learning classifiers. The machine learning classifiers may be a supervised machine learning classifier or an unsupervised machine learning classifier. The machine learning classifier may determine a weight corresponding to each risk factor allowing for qualitative balancing within the risk profiling platform to align to current enterprise priorities and industry loss and threat landscapes. The weight corresponding to each risk factor may include one or more components including at least a score multiplier assigned to the corresponding risk factor. For example, a weight may be a score multiplier assigned to the corresponding risk factor—a first risk factor (e.g., Financial Business Value) for an enterprise system may have an initial score of 200 with a weight of 1.5, and a second risk factor (e.g., "Regulatory Implication") may have a score of 100 with a weight of 2 for a total of 350, which is (200×1.5+100×2=350). In some examples, one or more weights may have multiple components, one of which is a score multiplier. Enterprise asset risk profiling platform 110 may determine an asset risk profile (ARP) score for the enterprise system based on the risk information and the weights of the risk factors. The computer-implemented method may thus include determining, based on the risk information and the weights, the ARP score for the enterprise system 140-150. The ARP quantitative score may indicate a qualitative ARP impact rank of the enterprise system in the organization.

Enterprise asset risk profiling platform 110 may include a first machine learning classifier that may determine a weight corresponding to each risk factor. Enterprise asset risk profiling platform 110 may include a second machine learning classifier that may determine the ARP score for the enterprise system. In some examples, enterprise asset risk profiling platform 110 may use the same machine learning classifier to determine the weight corresponding to each risk factor and the ARP score for the enterprise system. The computer-implemented method may include determining, based on the ARP score, an ARP impact rank of a first level or a second level, the first level ranked and comprising corresponding weights higher than the second level, determining, based on the ARP score and the ARP impact rank, a risk control scheme associated with the enterprise system, the risk control scheme for the first level being different from the risk control scheme for the second level, and providing, to an enterprise control server, the risk control scheme. The compromise of the enterprise system may be a compromise of confidentiality, integrity, availability, or combinations thereof Enterprise asset risk profiling platform 110 may determine a risk control scheme associated with the enterprise system based on the ARP score. The first level of the ARP impact rank may include the ARP score of a first threshold or above and be indicative of a critical impact system, and the second level of the ARP impact rank may include the ARP score of below the first threshold and be indicative of a less critical impact system than the critical impact system of the first level such that the risk control scheme for the first level applies an enhanced critical control scheme compared to the risk control scheme for the second level. For example, systems of a first level (e.g., the most critical impact systems) may have ARP scores of a first threshold or above, systems of a second level (e.g., second most critical impact systems) may have ARP scores between first and second thresholds, systems of a third level (e.g., high impact systems) may have ARP scores between second and third thresholds, systems of a fourth level (e.g., moderate impact systems) may have ARP scores between third and fourth thresholds, systems of a fifth level (e.g., low impact systems) may have ARP scores between fourth and fifth thresholds, and systems of a sixth level (e.g., minimal impact systems) may have ARP scores below the fifth threshold. Based on these ARP impact ranks, the first level systems (e.g., the most critical impact systems) may correspond to a first risk control scheme (e.g., "top level" risk control scheme), the second level systems may correspond to a second risk control scheme (e.g., second most critical impact systems may correspond to a high level risk control scheme), and one or more of the remaining level systems may correspond to a third risk control scheme (e.g., high impact, moderate impact, low impact, and minimal impact systems may correspond to a baseline level risk control scheme).

Risk profile database system 120 may store risk information related to enterprise systems. Risk profile database system 120 may receive a request from enterprise asset risk profiling platform 110 and retrieve the corresponding risk information. Risk profile database systems may receive and store the risk factors and their weights, the ARP scores and the risk control schemes generated by enterprise asset risk profiling platform 110.

User devices 130 may be any device that belongs to a user who has access to or manages the enterprise asset risk profiling platform 110. For example, a user may display via user devices 130 the risk information, a ranking criterion on the risk factors, the weights, the ARP scores and the risk control schemes for the enterprise systems. User devices 130 may include computing devices, such as laptop computers, desktop computers, mobile devices, smart phones, tablets, and the like. According to some examples, user devices 130 may include hardware and software that allow them to connect directly to network 170. Alternatively, user devices 110 may connect to a local device, such as a personal computer, server, or other computing device, which connects to network 170.

System 100 may include one or more enterprise systems 140-150. Enterprise systems 140-150 may contain enterprise resources (e.g. hardware, devices, data, software) that may be prioritized based on their classifications, criticality and values in the organization. The organization may strategically apply protective and detective security controls on its critical assets and enhance capabilities to respond to potential threats and recover from realized risks. Enterprise asset risk profiling platform 110 may monitor enterprise systems 140-150. Enterprise systems 140-150 may send the relevant risk information to enterprise asset risk profiling platform 110 for further processing.

Enterprise control server 160 may receive risk control schemes from enterprise asset risk profiling platform 110 and implement the risk control scheme on the enterprise system. For example, an enterprise system may have the "baseline level" risk control scheme, and enterprise control server 160 may implement a National Institute of Standards and Technology (NIST) compliant password guidelines on the enterprise system. Enterprise control server 160 may periodically audit the enterprise system to ensure its compliance.

Enterprise asset risk profiling platform 110, risk profile database system 120, user devices 130, enterprise systems 140-150, and enterprise control server 160, may be associated with a particular authentication session. Enterprise asset risk profiling platform 110 may receive, process, and/or store a variety of risk factors and their weights, the ARP scores and the risk control schemes, and/or receive risk information with enterprise systems 140-150 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, unstructured databases, and/or a combination thereof. The network 170 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
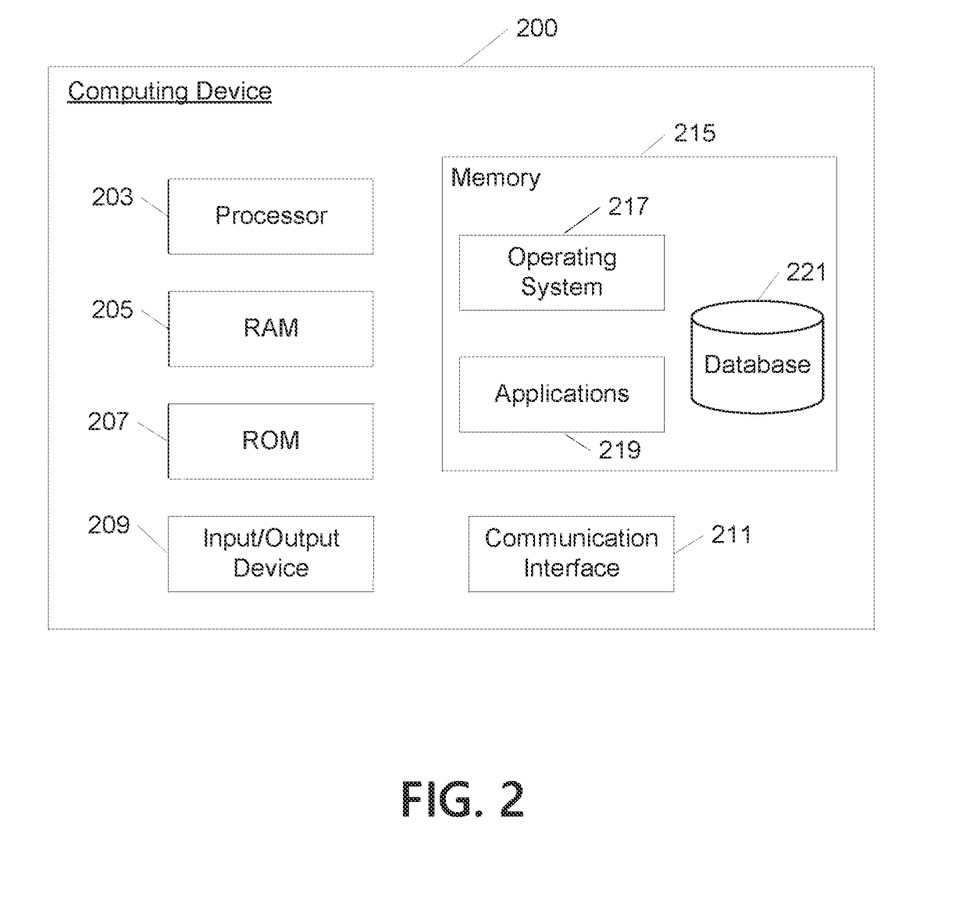
FIG. 2 depicts an illustrative computing environment for asset risk profiling in accordance with one or more example embodiments.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device configured to perform the processes and functions described herein.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the scope of the disclosure.

Enterprise asset risk profiling platform 110 may provide a holistic view of the enterprise systems from the perspectives of security protection, privacy protection, operational risk protections, availability protection, confidential protection and/or integrity protection. Enterprise asset risk profiling platform 110 may use a machine learning classifier to prioritize the protection of enterprise resources via multiple iterations in consideration of various data categories, risk factors and impact levels.

Figure 3:
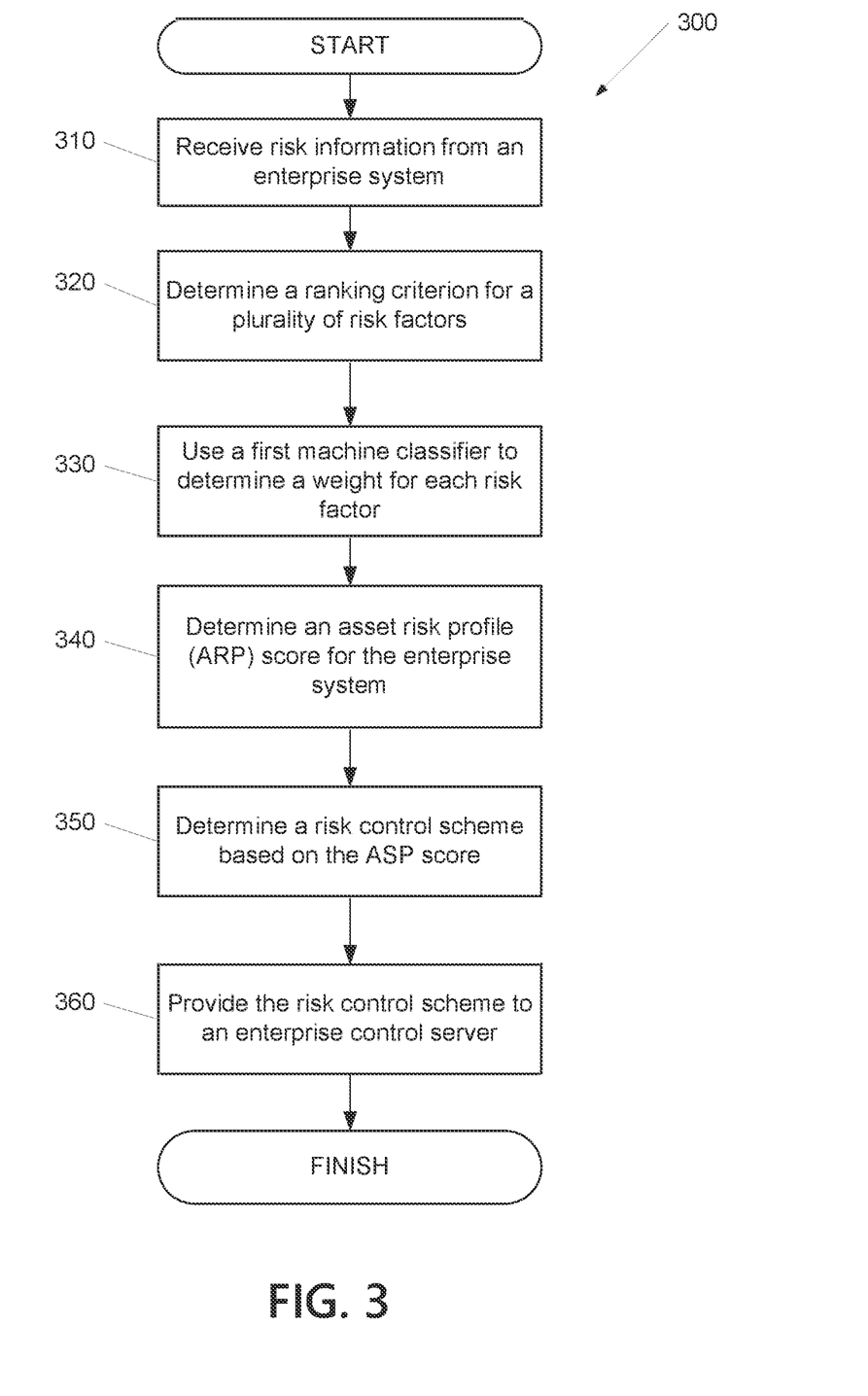
FIG. 3 depicts an illustrative method for asset risk profiling in accordance with one or more example embodiments.

FIG. 3 depicts an illustrative method for asset risk profiling in accordance with one or more example embodiments. Some or all of the steps of process 300 may be performed using one or more computing devices as described herein. In a variety of embodiments, some or all of the steps described below may be combined and/or divided into sub-steps as appropriate.

At step 310, an enterprise asset risk profiling platform 110 may receive risk information from an enterprise system such as enterprise systems 140-150. The risk information may indicate the expected loss for enterprise systems 140 or 150 in the event of a comprise in confidentiality, integrity, and/or availability. The risk information may indicate other risks such as security, privacy protection, operational risks. In a variety of embodiments, the risk information may include one or more aspects of alignment to enterprise strategic initiatives, product security, vulnerability scanning, operational risk, data governance, data loss prevention, privileged account management, privacy, cyber risk assessment, control effectiveness testing, supplier security, cyber security control baselines, and cloud migration, etc.

At step 320, the enterprise asset risk profiling platform 110 may determine a ranking criterion for a plurality of risk factors. The risk factors may be classified into various data categories based on the pervasiveness and business value of the enterprise system and the impact if the system is compromised. For example, a first level system may include information, data, digital asset or technology that may be mission critical to the organization such that a compromise may have the ability to cause catastrophic damage from a reputational, competitive advantage or financial standpoint.

Figure 4:
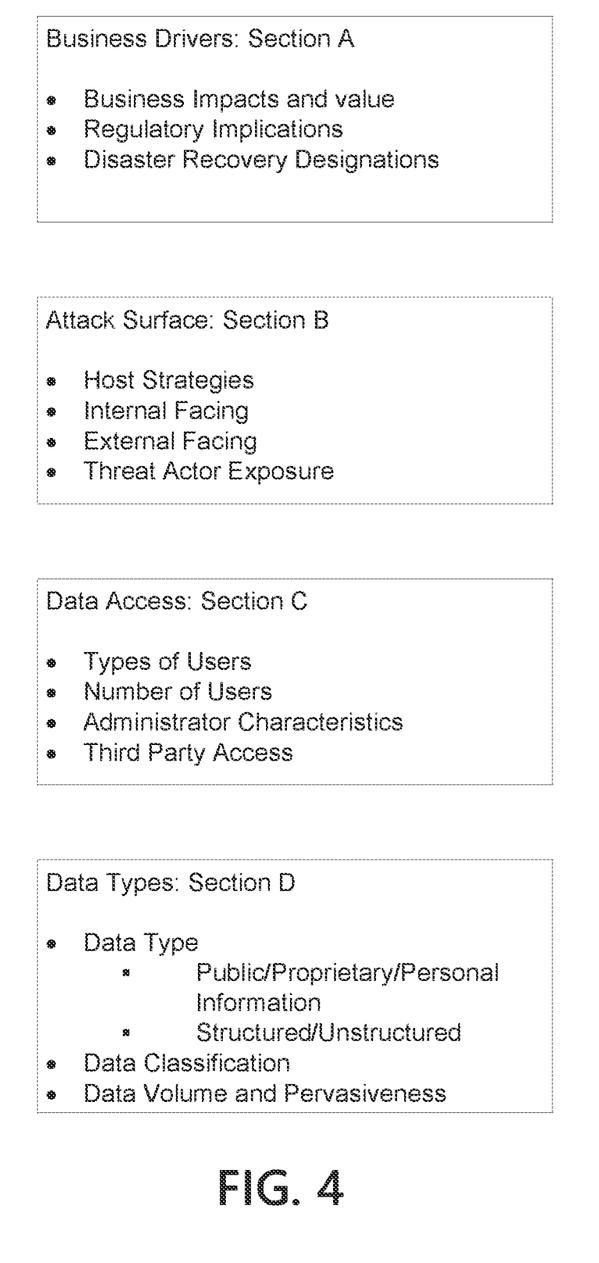
FIG. 4 depicts an illustrative a ranking criterion in accordance with one or more example embodiments.

FIG. 4 depicts an illustrative ranking criterion in accordance with one or more example embodiments. In the example illustrated in FIG. 4, the risk factors are categorized into four sections: section A: business drivers, which may include risk factors related to business impacts and value, regulatory implications and disaster recovery designations; section B: attack surface, which may include risk factors related to host strategies, internal facing, external facing, and threat actor exposure; section C: data access, which may include risk factors related to types and number of users, administrator characteristics, and third party access; Section D: data types, which may include risk factors related to data type such as public, proprietary or personal information, structured or unstructured data, data classification, and data volume and pervasiveness. Each risk factor may be assigned with an initial weight or a score based on the perceived criticality or impact of the enterprise system in the organization. The weight or score may be assigned by a system administrator based on current loss and industry threat data, feedback from the risk management experts, user community and alignment with senior leadership. The weight or score point may be assigned automatically by the enterprise asset risk profiling platform. The enterprise asset risk profiling platform 110 may further fine-tune the weights in step 330 of FIG. 3.

Referring back to FIG. 3, at step 330, the enterprise asset risk profiling platform 110 may use a first machine learning classifier to determine a weight for each risk factor leveraging current enterprise priorities and industry loss and threat landscapes. The first machine learning classifier may receive the risk factors as inputs, and generate an output including a weight for each of the risk factors. A first machine learning model may receive a collection of risk data and labels associated with a plurality of enterprise systems as training data. The training data may include risk factors associated with pre-labeled enterprise systems. The risk factors may be previously calibrated with the corresponding weights. The administrator may label the enterprise systems as first level (e.g. most critical impact), second level (e.g., second most critical impact), third level (e.g. high impact), fourth level (e.g. moderate impact), fifth level (e.g. low impact), or sixth level (e.g. minimal impact). The first machine learning classifier may adjust the weights in each iteration of training. Thus, using the first machine learning classifier for the computer-implemented method may include receiving a collection of risk data and labels associated with a plurality of enterprise systems, training the first machine learning classifier based on the collection of risk data and the labels, and determining the weights corresponding to each risk factor based on the trained first machine learning classifier. Further, a confidence score may be determined that is indicative of whether a predicted label output by the first machine learning classifier matches a pre-defined label of the enterprise system 140-150. The first machine learning classifier may be tuned until the confidence score exceeds a first predetermined threshold.

Figure 5:
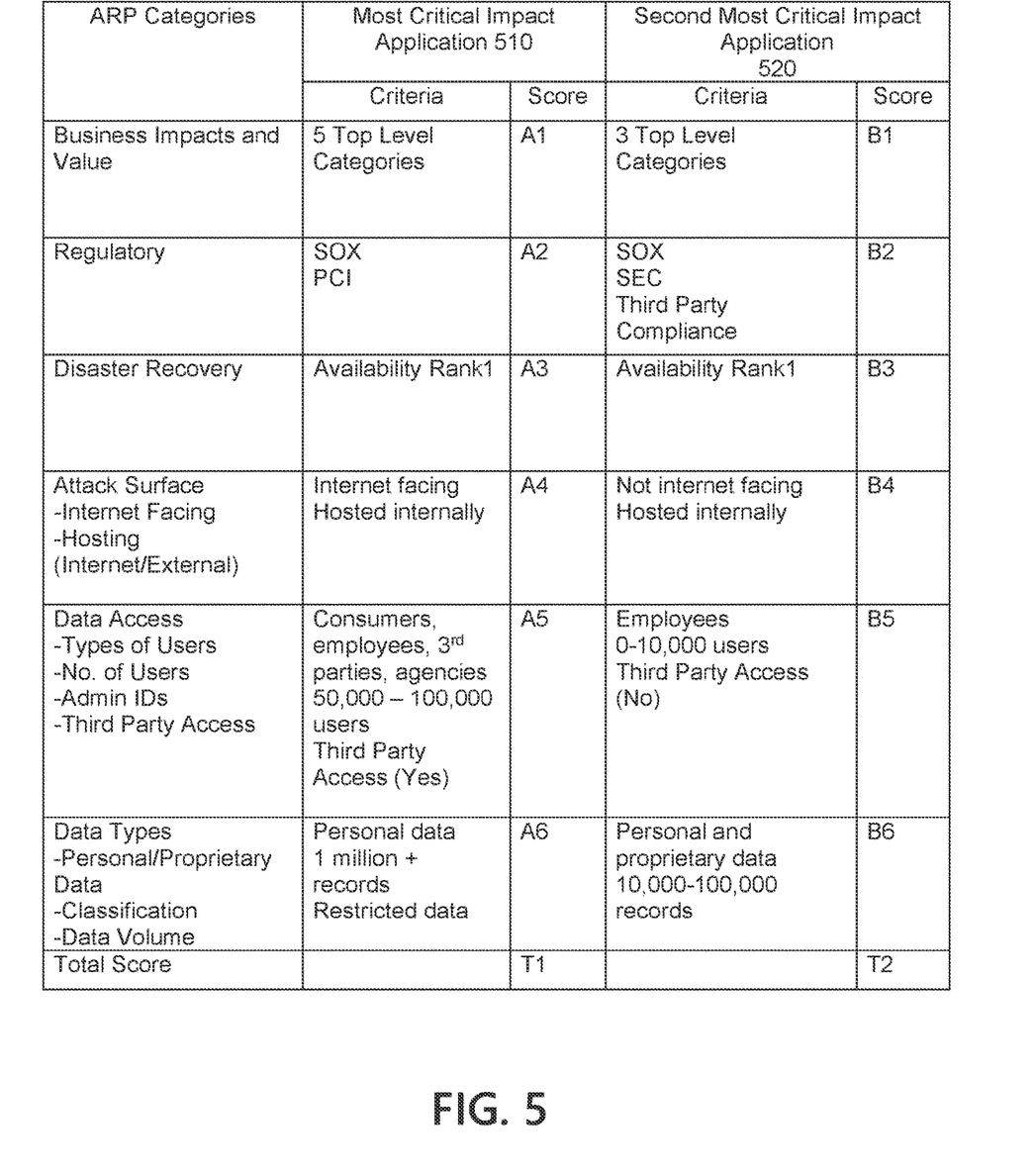
FIG. 5 depicts example Asset Risk Profile (ARP) scores in accordance with one or more example embodiments.

At step 340, the enterprise asset risk profiling platform 110 may determine an asset risk profile (ARP) score for the enterprise system 140. FIG. 5 depicts example ARP scores in accordance with one or more example embodiments. In the example most critical application 510, each risk factor is associated with a corresponding score, for example, the Business Impacts and Value corresponding to score A1, regulatory A2, disaster recovery A3, attack surface A4, data access A5, and data types A6. The ARP score may be determined based on an aggregation of weights of the risk factors. For example, application 510 has an ARP score of T1, which may place application 510 into one of the most critical impact systems. Likewise, application 520 with an ARP score of T2 may belong to the second most critical systems.

Determining the ARP score may include using the weights generated by the first machine learning classifier as inputs for a second machine learning classifier, and using the second machine learning classifier to determine the ARP score for the enterprise system 140-150. In a variety of embodiments, the ARP score may be determined using a second machine learning classifier. For example, the weights generated by the first machine learning classifier may be used as inputs for the second machine learning classifier, and the second machine learning classifier may determine the APR score for the enterprise system. The second machine learning classifier may be different from the first machine learning classifier. The same machine learning classifier may also be used to determine the weights and the ARP score. In a variety of embodiments, the first machine learning classifier may be an unsupervised machine learning classifier and the second machine learning classifier may be a supervised machine learning classifier.

At step 350, enterprise asset risk profiling platform 110 may determine a risk control scheme based on the ARP score. For example, based on the ARP impact ranks, the most critical impact systems may correspond to a "top level" risk control scheme, the second most critical impact systems may correspond to a "medium level" risk control scheme, and the high impact, moderate impact, low impact, and minimal impact systems may correspond to a "low level" risk control scheme.

In a variety of embodiments, the "low level" risk control scheme may include enterprise control set related to privileged access rights, strategic testing, multifactor authentication for remote access etc. "Medium level" risk control scheme may include enhanced control set related to separation of environment, role-based access control, and risk assessment and remediation etc. "Top level" risk control scheme may include critical control set related to network segmentation, entitlements and format preserving encryption etc.

In a variety of embodiments, the enterprise asset risk profiling platform may train the machine learning classifier to determine the appropriate weights for the risk factors and the appropriate ARP scores for the enterprise systems using a confidence score. For example, the machine learning classifier may receive a collection of risk data and labels associated with a plurality of enterprise systems as training data. The training data may include risk factors associated with pre-labeled enterprise systems, such as "the most critical impact," "second most critical impact," "high impact," "moderate impact," "low impact," or "minimal impact." The machine learning classifier may use the risk factors, the weights, and the like as inputs to the machine learning classifier. The machine learning classifier may determine a confidence score indicating whether the predicted label matches with the pre-defined label of the enterprise system. The machine learning classifier may be tuned until a confidence score reaches a threshold value (e.g. 95%). The enterprise asset risk profiling platform may use the tuned machine learning classifier to determine the ARP scores for a particular enterprise system.

It should be readily apparent to one having ordinary skill in the art that a variety of machine learning classifier architectures can be utilized including (but not limited to) decision trees, k-nearest neighbors, support vector machines (SVM), neural networks (NN), recurrent neural networks (RNN), convolutional neural networks (CNN), probabilistic neural networks (PNN), transformer models, and the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized, more specific machine learning classifiers when available, and general machine learning classifiers at other times can further increase the accuracy of predictions.

At step 360, enterprise asset risk profiling platform 110 may provide the risk control scheme to an enterprise control server 160. The enterprise control server 160 may implement the risk control scheme and audit the enterprise system periodically for compliance to the risk control scheme.

Embodiments disclosed herein improve enterprise systems, methods, and/or associated computing devices, such as by increasing processing data speeds, and using asset risk profiling as disclosed herein for managing enterprise systems to improve the associated computer technology via at least increasing reliability or security or both. As such, the devices, systems, and methods disclosed herein increase the speed by which risk is evaluated, decrease and/or mitigate the likelihood of compromise, and decrease system down time associated with such comprise and risk.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computer-implemented method comprising:
receiving risk information from a plurality of computing devices associated with an enterprise system, the risk information associated with a plurality of risk factors associated with the enterprise system, wherein the risk information is indicative of a likelihood score associated with an expected impact of loss for each risk factor in an event of a compromise of the enterprise system, prior to an application of enterprise controls;
determining a ranking criterion for the plurality of risk factors associated with the enterprise system;
receiving training data associated with a plurality of enterprise systems;
training a first machine learning classifier via a machine learning model based on the training data associated with the plurality of enterprise systems to determine a weight corresponding to each risk factor;

adjusting each weight during each iteration of training of the first machine learning classifier;

using the first machine learning classifier that is trained via the machine learning model to generate as an output the weight corresponding to each risk factor based on an input of the ranking criterion and the risk information;

determining, based on the risk information and the weights generated by the first machine learning classifier as the output, an asset risk profile (ARP) score for the enterprise system;

determining, based on the ARP score, an ARP impact rank of a first level or a second level, the first level ranked and comprising corresponding weights higher than the second level;

determining, based on the ARP score and the ARP impact rank, a risk control scheme associated with the enterprise system, the risk control scheme for the first level being different from the risk control scheme for the second level; and providing, to an enterprise control server, the risk control scheme.

2. The computer-implemented method of claim 1, wherein the compromise of the enterprise system comprises a compromise of confidentiality, integrity, availability, or combinations thereof.

3. The computer-implemented method of claim 1, wherein using the first machine learning classifier comprises:
  receiving a collection of risk data and labels as the training data associated with the plurality of enterprise systems; and
  training the first machine learning classifier based on the collection of risk data and the labels.

4. The computer-implemented method of claim 3, wherein using the first machine learning classifier further comprises:
  determining a confidence score indicative of whether a predicted label output by the first machine learning classifier matches a pre-defined label of the enterprise system.

5. The computer-implemented method of claim 4, wherein using the first machine learning classifier further comprises:
  tuning the first machine learning classifier until the confidence score exceeds a first predetermined threshold.

6. The computer-implemented method of claim 1, wherein determining the ARP scores comprises:
  using the weights generated by the first machine learning classifier as inputs for a second machine learning classifier; and
  using the second machine learning classifier to determine the ARP score for the enterprise system.

7. The computer-implemented method of claim 6, wherein the first machine learning classifier is an unsupervised machine learning classifier and the second machine learning classifier is a supervised machine learning classifier.

8. The computer-implemented method of claim 1, further comprising:
  receiving one or more files; and
  extracting the risk information from the one or more files.

9. The computer-implemented method of claim 8, wherein the one or more files comprise audio files, internet files, visual files, audiovisual files, text files, image files, multimedia files, or combinations thereof.

10. The computer-implemented method of claim 1, wherein at least one of the risk factors is related to cyber-security threats or regulatory implications.

11. The computer-implemented method of claim 1, wherein the weight corresponding to each risk factor comprises one or more components including at least a score multiplier assigned to the corresponding risk factor.

12. The computer-implemented method of claim 1, wherein the first level of the ARP impact rank comprises the ARP score of a first threshold or above and is indicative of a critical impact system, and the second level of the ARP impact rank comprises the ARP score of below the first threshold and is indicative of a less critical impact system than the critical impact system of the first level such that the risk control scheme for the first level applies an enhanced critical control scheme compared to the risk control scheme for the second level.

13. The computer-implemented method of claim 1, further comprising:
  classifying the risk factors into a plurality of data categories based on a pervasiveness and a business value of the enterprise system, and an impact if the enterprise system is compromised.

14. The computer-implemented method of claim 13, further comprising:
  classifying the risk factors into one of a business drivers category, an attack surface category, a data access category, and a data types category.

15. An enterprise asset risk profiling platform comprising a processor configured to:
  receive risk information from a plurality of computing devices associated with an enterprise system, the risk information associated with a plurality of risk factors associated with the enterprise system, wherein the risk information is indicative of a likelihood score associated with an expected impact of loss for each risk factor in an event of a compromise of confidentiality, integrity, availability, or combinations thereof, prior to an application of enterprise controls;
  determine a ranking criterion for the plurality of risk factors associated with the enterprise system;
  receive training data associated with a plurality of enterprise systems;
  train a first machine learning classifier via a machine learning model based on the training data associated with the plurality of enterprise systems to determine a weight corresponding to each risk factor;
  adjust each weight during each iteration of training of the first machine learning classifier;
  use the first machine learning classifier that is trained via the machine learning model to generate as an output the weight corresponding to each risk factor based on an input of the ranking criterion and the risk information;
  determine, based on the risk information and the weights generated by the first machine learning classifier as the output, an asset risk profile (ARP) score for the enterprise system;
  determine, based on the ARP score, an ARP impact rank of a first level or a second level, the first level ranked higher than the second level;
  determine, based on the ARP score and the ARP impact rank, a risk control scheme associated with the enterprise system, the risk control scheme for the first level being different from the risk control scheme for the second level; and provide, to an enterprise control server, the risk control scheme.

16. The enterprise asset risk profiling platform of claim 15, wherein using the first machine learning classifier comprises:
receiving a collection of risk data and labels as the training data associated with the plurality of enterprise systems; and
training the first machine learning classifier based on the collection of risk data and the labels.

17. The enterprise asset risk profiling platform of claim 16, wherein using the first machine learning classifier further comprises:
determining a confidence score indicating whether a predicted label output by the first machine learning classifier matches a pre-defined label of the enterprise system.

18. The enterprise asset risk profiling platform of claim 17, wherein using the first machine learning classifier further comprises:
tuning the first machine learning classifier until the confidence score exceeds a first predetermined threshold.

19. The enterprise asset risk profiling platform of claim 15, wherein determining the ARP scores comprises:
using the weights generated by the first machine learning classifier as inputs for a second machine learning classifier; and
using the second machine learning classifier to determine the ARP score for the enterprise system.

20. An enterprise asset risk profiling platform comprising at least a machine learning classifier, a processor communicatively coupled to the at least a machine learning classifier, a non-transitory computer-readable memory communicatively coupled to the processor, and machine-readable instructions stored in the non-transitory memory that, when executed by the processor, cause the processor to:
receive risk information from a plurality of computing devices associated with an enterprise system, the risk information associated with a plurality of risk factors associated with the enterprise system, wherein the risk information is indicative of a likelihood score associated with an expected impact of loss for each risk factor in an event of a compromise of confidentiality, integrity, availability, or combinations thereof, prior to an application of enterprise controls;
determine a ranking criterion for the plurality of risk factors associated with the enterprise system;
receive training data associated with a plurality of enterprise systems;
train a first machine learning classifier via a machine learning model based on the training data associated with the plurality of enterprise systems to determine a weight corresponding to each risk factor;
adjust each weight during each iteration of training of the first machine learning classifier;
use the at least a machine learning classifier that is trained via the machine learning model to generate as an output the weight corresponding to each risk factor based on an input of the ranking criterion and the risk information;
determine, based on the risk information and the weights generated by the at least a machine learning classifier as the output, an asset risk profile (ARP) score for the enterprise system;
determine, based on the ARP score, an ARP impact rank of a first level or a second level, the first level ranked higher than the second level;
determine, based on the ARP score and the ARP impact rank, a risk control scheme associated with the enterprise system, the risk control scheme for the first level being different from the risk control scheme for the second level; and
provide, to an enterprise control server, the risk control scheme.

* * * * *